United States Patent [19]

Nunez

[11] Patent Number: 4,935,254

[45] Date of Patent: Jun. 19, 1990

[54] BANANA FLAVORING PROCESS

[75] Inventor: Elena Nunez, Tela Railroad La Lima, Honduras

[73] Assignee: Chiquita Brands, Inc., Cincinnati, Ohio

[21] Appl. No.: 273,691

[22] Filed: Nov. 21, 1988

Related U.S. Application Data

[63] Continuation of Ser. No. 186,881, Apr. 27, 1988, abandoned.

[51] Int. Cl.$^5$ ............................ A23B 7/00; A23G 1/00
[52] U.S. Cl. ..................................... 426/304; 426/102; 426/289; 426/302; 426/306; 426/615
[58] Field of Search ............... 426/102, 289, 302, 304, 426/306, 615

[56] References Cited

U.S. PATENT DOCUMENTS

| | | | |
|---|---|---|---|
| 3,573,937 | 4/1974 | Sarna et al. | 426/441 |
| 3,974,301 | 8/1976 | Luh et al. | 426/640 |
| 4,242,365 | 12/1980 | Numata et al. | 426/615 |
| 4,273,792 | 6/1981 | Johnson et al. | 426/484 |
| 4,626,436 | 12/1986 | Bradley et al. | 426/302 |
| 4,675,195 | 6/1987 | Holton | 426/654 |

OTHER PUBLICATIONS

Memos and Agreement related to option for Sarna et al., U.S. Pat. No. 3,573,937, (1968–1971).
"Chiquita Banana Chips (Qualitative Research)", Yankelovich, Skelly and White, Inc., (Jun., 1985).
"Chiquita Banana Chip Taste Test", CLT Research Associates, (Dec., 1985).

*Primary Examiner*—Donald E. Czaja
*Assistant Examiner*—Helen Pratt
*Attorney, Agent, or Firm*—Fish & Richardson

[57] ABSTRACT

A process for producing a banana flavored banana chip includes frying banana slices, coating the fried slices with banana puree; quick frying the coated slices; and cooling the quick fried coated slices to yield the flavored banana chips. A process for producing a banana flavored, low moisture, starchy food includes coating pieces of the food with banana puree; and reducing the moisture in the coated pieces to a low level.

17 Claims, No Drawings

BANANA FLAVORING PROCESS

This is a continuation of application Ser. No. 186,881, filed Apr. 27, 1988, now abandoned.

BACKGROUND OF THE INVENTION

The invention relates to banana flavored foods.

Many snack foods and breakfast cereals consist of a starchy food base which has been heated, e.g., by hot air or by frying in edible oil. The heat lowers the moisture content in the food to make the food shelf stable at room temperature. Flavorings or condiments are added prior to, during, or after heating, and the snacks or breakfast cereals are normally crunchy when eaten.

It is known that banana chips, a snack food, can be sugar sweetened, unsweetened, honey flavored, salted, or chocolate coated.

It is also known to make unsweetened or "natural" banana chips by a process similar to the process of making of potato chips. According to the process, green bananas having a high starch residual content are peeled, sliced, deep fried and drained. Salty banana or plantain chips are made by sprinkling the fried chips with salt after draining. Sweet banana chips are made by frying the slices a first time, coating the chips with a sugar solution, frying them a second time, and draining the fried chips. A banana essence may be added to either the sweetened, salted, or unsweetened chips after frying to provide the chips with additional banana flavor.

SUMMARY OF THE INVENTION

In general, the invention features, in one aspect, a process for producing a banana flavored banana chip. The process includes frying banana slices, during which the banana flavor of the chips is destroyed; coating the fried slices with banana puree to supply banana flavor to the slices; quick frying the coated slices; and cooling the quick fried coated slices to yield the flavored banana chips.

The term quick frying, as used herein, means that the slices are fried sufficiently long (e.g., for 15 to 50 seconds in an edible oil at 300° to 350° F.) so that the puree coating is tempered (made crunchy) but not so long that the banana flavor of the puree is lost. The banana chips obtained from the process thus have a natural banana flavor.

The term banana puree, as used herein, refers to the product obtained by mashing fully ripened peeled bananas and homogenizing and deaereating the resulting puree. The puree can be freshly made, frozen, or heat processed and packed in hermetically sealed containers. It can also be concentrated (by partial removal of the water) or diluted with water or other ingredients.

The invention features, in another aspect, a process for producing a banana-flavored, low moisture, starchy food. The process includes coating pieces of the food with banana puree to provide enhanced banana flavor to the pieces; and reducing the moisture in the coated pieces to a low level, which will make the pieces stable at room temperature. Food pieces obtained by the method have a natural banana flavor.

The term low moisture starchy foods, as used herein, refers to high starch foods whose water activity has been reduced enough to prevent spoilage at room temperature when packed in relatively moisture proof containers. The reduction in water activity may be accomplished, e.g., by the addition of additives such as sugars, gums, or starches to the food. Examples of such foods include snack foods such as potato chips, cassava chips, and tortilla chips; dehydrated fruits such as raisins, dried figs, and dried purees; and cereals such as corn flakes, crisped rice, and puffed cereals.

In some preferred embodiments of both featured processes, the banana puree includes a sweetener. In other preferred embodiments, the banana chips or food pieces are seasoned and are candy coated, e.g., with chocolate.

The term sweetener, as used herein, refers to cane or beet sugar, either crystallized or in the form of a syrup, corn syrup, honey, or other natural sweetener; saccharin, aspartame, or other artificial sweetener; or a combination of natural and artificial sweeteners.

The term seasoning, as used herein, refers to table salt, low sodium salt, paprika, dehydrated garlic, dehydrated onion, cinnamon, nutmeg, and any combination thereof, whether in powder or flake form.

Other features and advantages of the invention will be apparent from the following description of a presently preferred embodiments thereof and from the claims.

DESCRIPTION OF THE PREFERRED EMBODIMENTS

The bananas used to make banana chips preferably have a peel color index of 1, that is, when the peel is completely green but the fruit is completely developed. Such bananas generally have a starch content of about 20% of the weight of the pulp.

The following examples are representative of the processes of the invention.

EXAMPLE 1

To make a sweet banana chip, green bananas (peel index 1) are peeled by hand and sliced in a food processor or other suitable kitchen slicer to give uniform slices of 0.5 to 4.0 mm thick. The slices are submerged in a weak ascorbic acid aqueous solution (typically 0.05 to 0.20% by weight) to prevent dark discoloration, and are rapidly drained and fed to a batch fryer containing a partially saturated edible oil such as a hydrogenated mixture of 80% african palm olein and 20% cottonseed oil. The temperature of the oil and the length of immersion may be adjusted depending on the final characteristics desired in the finished product; typically the temperature of the oil would be 350° F. at the beginning of frying. The frying time would be from 2 to 10 minutes. The exact frying time depends on the ratio of banana chips to oil; the higher the ratio, the longer the frying time. At the end of this time, the slices are allowed to drain briefly and then spread one layer high in a tray. The chips are then coated with a mixture of 60% banana puree and 40% cane sugar. The slices are drained and quick fried at 350° F. for 15 to 50 seconds to temper the coating. The weight of the coating should preferably be 40 to 60% of the weight of the uncoated slices. Following quick frying, the slices are drained and dumped from the basket into paper towels to absorb the excess oil. Once cooled, the banana chips are packed in flexible plastic bags.

EXAMPLE 2

To make a sweet-salty banana chip, the procedure in Example 1 is followed, except that the coating is made of a mixture of 80% banana puree and 20% sugar; the coating is 15 to 25% by weight based on the weight of the uncoated chips; and the chips, after quick frying, are sprinkled with a small amount of salt, typically from 0.5 to 2.0% of the weight of the chips.

EXAMPLE 3

To make a natural banana chip, the steps of Example 1 are repeated, except that the coating consists of 100% banana puree.

EXAMPLE 4

To make a salty banana chip, the steps of Example 1 are repeated, except that the coating consists of 100% banana puree, and the banana chips are sprinkled with a small amount of salt as a last step before bagging.

EXAMPLE 5

To make a chocolate-coated banana chip, the steps of Example 1 are repeated, except that at the end of the process, the banana chips are dipped in chocolate and the coating allowed to harden before bagging.

EXAMPLE 6

To make a banana flavored corn flake breakfast cereal, finished corn flakes, as normally sold in supermarkets, are coated with banana puree either alone or in combination with sugar or other ingredients. The excess puree is drained off in a colander or kitchen sieve and the flakes are spread in a thin layer on a Teflon ®coated cookie sheet and baked at 350° F. for a time needed to dry the coating and restore the crunchiness of the original flakes. The exact time of baking depends on the loading of flakes per unit area of tray and on the particular characteristics of the oven. Drying in an air circulation oven at a lower temperature will yield a product with slightly different organoleptic characteristic.

Other embodiments are within the following claims.

I claim:

1. A process for producing banana-flavored, low moisture foods, comprising
   providing pieces of a starchy food having a low moisture content;
   coating said pieces with banana puree; and
   reducing the moisture in said coated pieces to a low level.

2. The process of claim 1 wherein said banana puree comprises a sweetener.

3. The process of claims 1 or 2, further comprising seasoning said pieces.

4. The process of claims 1 or 2, further comprising coating said pieces with chocolate.

5. The process of claim 1 wherein said food pieces are a cereal.

6. The process of claim 5 wherein said cereal food pieces are corn flakes.

7. The process of claim 1 wherein said food pieces are selected from the group consisting of potato chips, cassava chips, and tortilla chips.

8. The process of claim 1 wherein said food pieces are dehydrated fruit.

9. A process for obtaining a banana flavored banana chip comprising
   frying banana slices, destroying the banana flavor of said slices;
   coating said fried slices with banana puree, said puree supplying banana flavor to said slices;
   quick frying said coated slices; and
   cooling said fried coated slices to yield said flavored banana chips.

10. The process of claim 9 wherein said banana puree comprises a sweetener.

11. The process of claims 9 or 10, further comprising seasoning said banana chips.

12. The process of claims 9 or 10, further comprising coating said banana chips with a candied coating.

13. The process of claim 12 wherein said candied coating comprises chocolate.

14. The process of claim 9 wherein the weight of said puree coating is between 40 and 60% of the original weight of said fried slices.

15. The process of claim 9 wherein said coated slices are fried in an edible oil.

16. The process of claim 15 wherein said coated slices are fried in said edible oil for 15 to 50 seconds.

17. The process of claim 15 wherein the temperature of said edible oil during said frying is 300 to 350° F.

* * * * *